United States Patent [19]

Dannels et al.

[11] 4,290,744
[45] Sep. 22, 1981

[54] APPARATUS FOR RUNNERLESS INJECTION-COMPRESSION MOLDING THERMOSETTING MATERIALS

[75] Inventors: W. Andrew Dannels, Grand Island, N.Y.; Robert W. Bainbridge, Gainesville, Ga.

[73] Assignee: Hooker Chemicals & Plastics Corp., Niagara Falls, N.Y.

[21] Appl. No.: 118,381

[22] Filed: Feb. 5, 1980

Related U.S. Application Data

[63] Continuation-in-part of Ser. No. 972,182, Dec. 21, 1978, abandoned.

[51] Int. Cl.³ .............................. B29F 1/08; B29G 3/00
[52] U.S. Cl. ................................. 425/543; 264/328.7; 425/548; 425/549; 425/572; 425/590
[58] Field of Search ............... 425/543, 548, 549, 552, 425/568, 569, 572, 590; 264/328.7

[56] References Cited

U.S. PATENT DOCUMENTS

| | | | |
|---|---|---|---|
| 3,632,729 | 1/1972 | Bielfeldt | 264/294 |
| 3,787,159 | 1/1974 | Bielfeldt | 425/543 |
| 3,797,984 | 3/1974 | Yago | 425/543 |
| 3,819,312 | 6/1974 | Arpajian | 425/543 |
| 4,017,242 | 4/1977 | Mercer | 425/543 |

FOREIGN PATENT DOCUMENTS 46-18627  5/1971  Japan .................... 425/564

*Primary Examiner*—Thomas P. Pavelko
*Attorney, Agent, or Firm*—James F. Mudd; David A. Stein

[57] ABSTRACT

An improved molding apparatus for injection-compression molding thermosetting materials is described. The apparatus comprises a stationary platen assembly, a moveable platen assembly and a feed nozzle assembly.

The stationary assembly is comprised of a stationary platen member, a heated plate mounted on the support plate and a plurality of mold faces mounted on the heat plate.

The movable assembly is comprised of a moveable platen member, a heated plate mounted thereon and a plurality of mold faces mounted on the heat plate aligned with the mold faces on the stationary assembly.

The feed, or injection, nozzle assembly is comprised of a cylindrical nozzle member, having an internal temperature controlling means, and a plurality of feed outlets positioned on the periphery. The temperature maintained in the nozzle member is sufficiently high to maintain the thermosetting molding material within the nozzle member in a plasticized state and sufficiently low that no substantial curing or setting-up of the thermosetting molding material within the nozzle member in a plasticized state and sufficiently low that no substantial curing or setting-up of the thermosetting molding material takes place.

11 Claims, 4 Drawing Figures

APPARATUS FOR RUNNERLESS INJECTION-COMPRESSION MOLDING THERMOSETTING MATERIALS

REFERENCE TO PRIOR APPLICATION

This is a continuation-in-part of application Ser. No. 972,182 filed Dec. 21, 1978, now abandoned.

BACKGROUND OF THE INVENTION

The present application is related to U.S. application Ser. No. 972,181 filed Dec. 21, 1978, entitled "Apparatus for Runnerless Injection Molding Thermosetting Materials".

The present invention relates to an improved apparatus for injection molding thermosetting materials and, more particularly, to injection molding of thermosetting synthetic resin compositions.

Injection molding is an advatageous method of forming articles of synthetic resin. In general terms, injection molding is a process wherein the molding composition, in a melted or plasticized state, is injected into the mold cavity. Typically, cold molding composition in granular form is fed from a hopper into a heated cylinder containing a screw. The molding composition is heated, melted and plasticized on the screw flights, and then the screw, acting as a ram, injects the melted and plasticized material into a mold cavity. In the case of thermosetting material, the molded material is cured in the mold by compaction and by heat added to the mold cavity. After curing, the article is ejected from the mold and the process repeated. Injection molding offers the advantages of reduced molding cycles, better control of process variables, and increased productivity as compared with conventional compression and transfer molding processes. The major disadvantage with the injection molding of thermosetting materials is the generation of a considerable amount of waste material, particularly when multiple cavity systems are employed. The waste material is generated by thermosetting material that has cured, become infusible, in the runner and sprue systems and cannot be reused. The amount of non-reusable waste material generated in this fashion can be substantial, ranging typicaly from about 15 to about 80 percent of the total amount of material required to mold an article.

A recent technical advance in the molding art has been the adaptation of the runnerless injection, or cold manifold, process to the injection molding of thermosetting resins. In the cold manifold process, the material in the sprue and manifold system is maintained at a temperature sufficient to maintain the material in a plasticized condition, without causing the material to prematurely cure or "set-up". Thus, when a cured part is removed from the mold cavity, the material in the sprue and manifold becomes part of the next molding, instead of being discarded as in conventional injection molding operations. The runnerless injection process, therefore, provides for significant savings in material.

The thermosetting material usually employed in runnerless injection processes differ in some respects from materials normally employed in conventional injection processes because of the different requirements of each process. One significant difference is that a runnerless injection material is adapted to remain in a plasticized or fused condition in the feed system for extended periods of time without prematurely curing, usually at temperatures between about 104° and about 116° C. (220° to 240° F.) while also being capable of rapidly curing in the mold cavity at the molding temperature, usually about 170° C. (340° F.). Although such formulations are useful in the present invention, they are not required, and the molding compositions presently utilized may be selected from the more economical and more readily available standard thermosetting molding compositions. Examples of suitable runnerless injection molding compositions are described in U.S. Ser. No. 915,335 filed June 13, 1978, entitled "Phenolic Resins With Improved Low Temperature Processing Stability". The disclosure in the referred application is hereby incorporated herein by reference.

Thermosetting molding materials useful in the present invention may suitably be selected from thermosetting synthetic resins and resin compositions typically used in molding operations, for example, phenolic; amino, such as, urea, melamine and melamine/phenolic; polyester resins in granualr, nodular, bulk or sheet forms; alkyd; epoxy; silicone; diallylphthalate; polyamides, or; from thermosetting natural and synthetic rubber compositions. Phenolic resin compositions are especially useful as the molding material. Phenolic resin compositions used in molding operations are usually employed in the form of molding compositions. Phenolic molding compositions typically are particulate in form containing grade phenolic resin, a cross-linking agent, such as hexamethylenetetramine, and suitable filler materials.

Conventional reciprocating screw-type molding machines have a feed unit comprised of a nozzle member mounted on the front of a heated barrel. A reciprocal and rotatable screw is positioned within the barrel. The rotating motion of the screw plasticizes a thermosetting molding material within the barrel. Subsequently, a reciprocating motion of the screw, acting as a ram, feeds the plasticized molding material through the nozzle member, through a runner system, into a closed mold. The mold is heated to a temperature sufficiently high to cure the molding material.

The technique of injection-compression molding basically consists of injecting a charge of plasticized molding material into a partially open mold; the final fill, or mold fit, is accomplished by a separate step, the subsequent complete closure of the mold. Injection-compression molding makes possible a combination of the positive attributes of compression molding, i.e., improved dimensional stability, uniform density, low shirnkage and impact strength, with the automation and fast cure of injection molding.

The present invention provides an improved apparatus for adapting the advantages of injection-compression molding to include the advantage of runnerless injection techniques and facilitates the use of standard, less costly, phenolic molding composition in such apparatus.

GENERAL DESCRIPTION OF THE INVENTION

The present invention provides an improved molding apparatus for injection-compression molding of thermosetting molding materials. The apparatus comprises a stationary platen assembly, a moveable platen assembly and a feed nozzle assembly.

The stationary assembly is comprised of a stationary platen member, or support plate, a heated plate mounted on the support plate and a plurality of mold faces mounted on the heat plate. In one mold of the invention, the heated plate is provided with a temperature controlled sleeve member positioned therein. The sleeve member is adapted to receive the feed nozzle therethrough and separate the feed nozzle from the heated plate.

The moveable assembly is comprised of a moveable platen member, or support plate, a heated plate mounted thereon and a plurality of mold faces mounted on the heat plate corresponding to and adapted to be aligned with the mold faces on the stationary assembly to form mold cavities.

The feed or injection, nozzle assembly is comprised of a nozzle member, preferably cylindrical in shape, having a closed end and an open end. The open end is preferably fitted with standard threads to facilitate attachment of the nozzle member to the feed barrel of a conventional screw-type molding machine. The nozzle member has a temperature controlling means disposed therein, and has a plurality of feed outlets or orifices positioned along the outside periphery of the nozzle member near the closed end. The temperature maintained in the nozzle member is sufficiently high to maintain the thermosetting molding material within the nozzle member in a plasticized state and sufficiently low that no substantial curing or setting-up of the thermosetting molding material takes place. By substantial curing or setting-up of the thermosetting molding material is meant the amount of premature polymerization which would adversely inhibit the plasticity or mobility of the molding material.

In the injection, or feed, stage the movable assembly is positioned to bring the mold faces on the moveable assembly into close proximity with the corresponding and aligned mold faces on the stationary assembly to form partially open mold cavities. Thermosetting molding material in a plasticized state is then fed through the nozzle member, through runner channels, into the partially open, heated, mold cavities.

The heated mold cavities are then closed completely by further movement, suitably by hydraulic means, of the moveable assembly in a direction toward the stationary assembly. This movement seals off the runner channels which confines thermosetting material within the mold cavity during compression and the curing cycle. The thermosetting material within the confines of the mold faces is thus pressed and heated to a temperature sufficiently high to cure the material.

After curing, the moveable assembly is retracted, moved away from the stationary assembly, suitably by hydraulic means, to remove the molded article and provide access to the mold face and surrounding area. The small amount of cured material in the runner channel is the only loss. The thermosetting material remaining in the nozzle and barrel is maintained in a plasticized, substantially uncrued, state, ready for the next shot or filling operation.

DETAILED DESCRIPTION OF THE INVENTION

The present invention will illustrated and more fully described by reference to the accompanying drawings.

Figure 1:
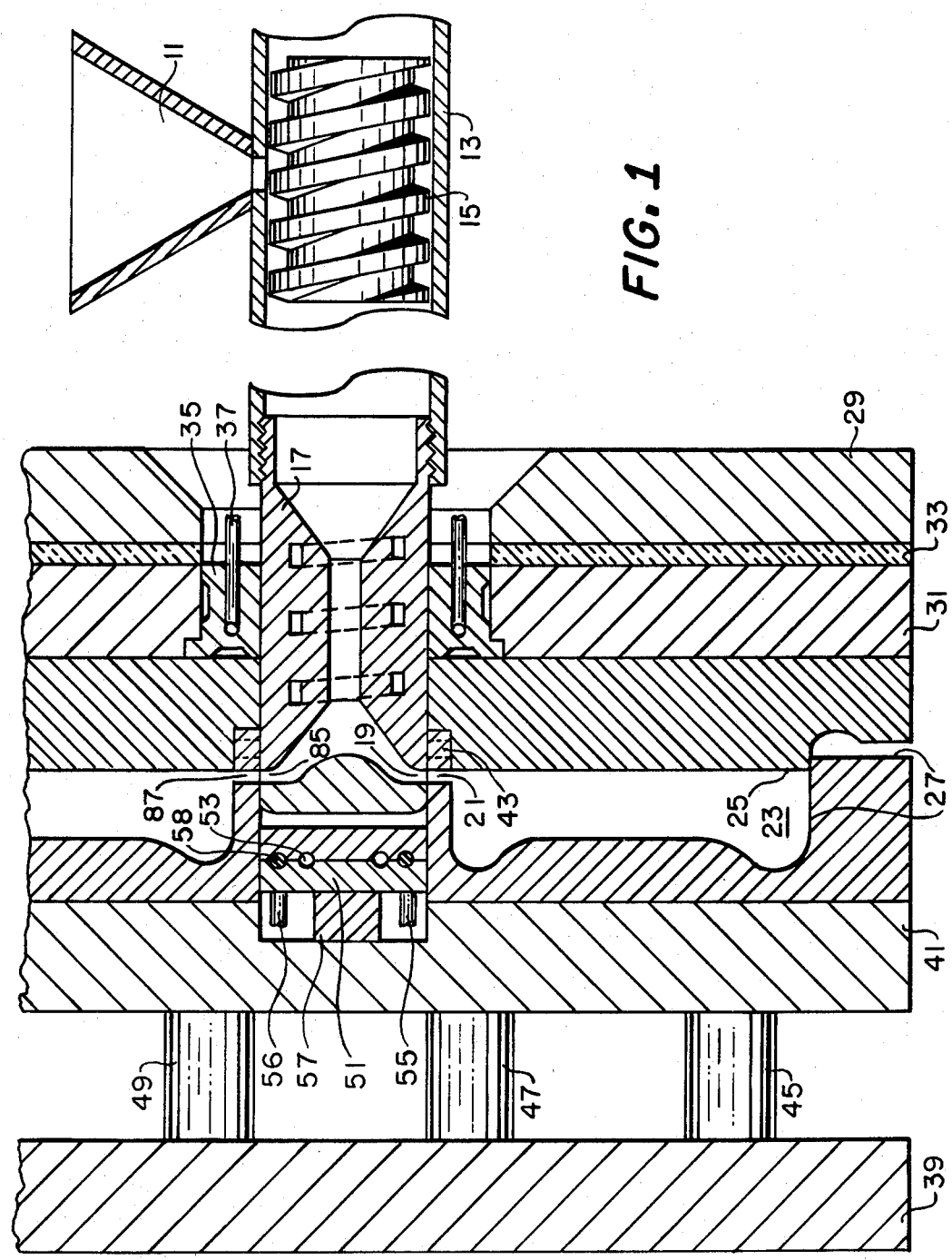

FIG. 1 is a cross-sectional, partly schematic view of an apparatus of the present invention. The apparatus shown is a portion of an injection molding machine having a horizontal clamping arrangement. As shown in FIG. 1, the apparatus is in the injection or feed stage of the molding cycle. In this stage, thermosetting molding material is fed into partially open molds.

Figure 2:
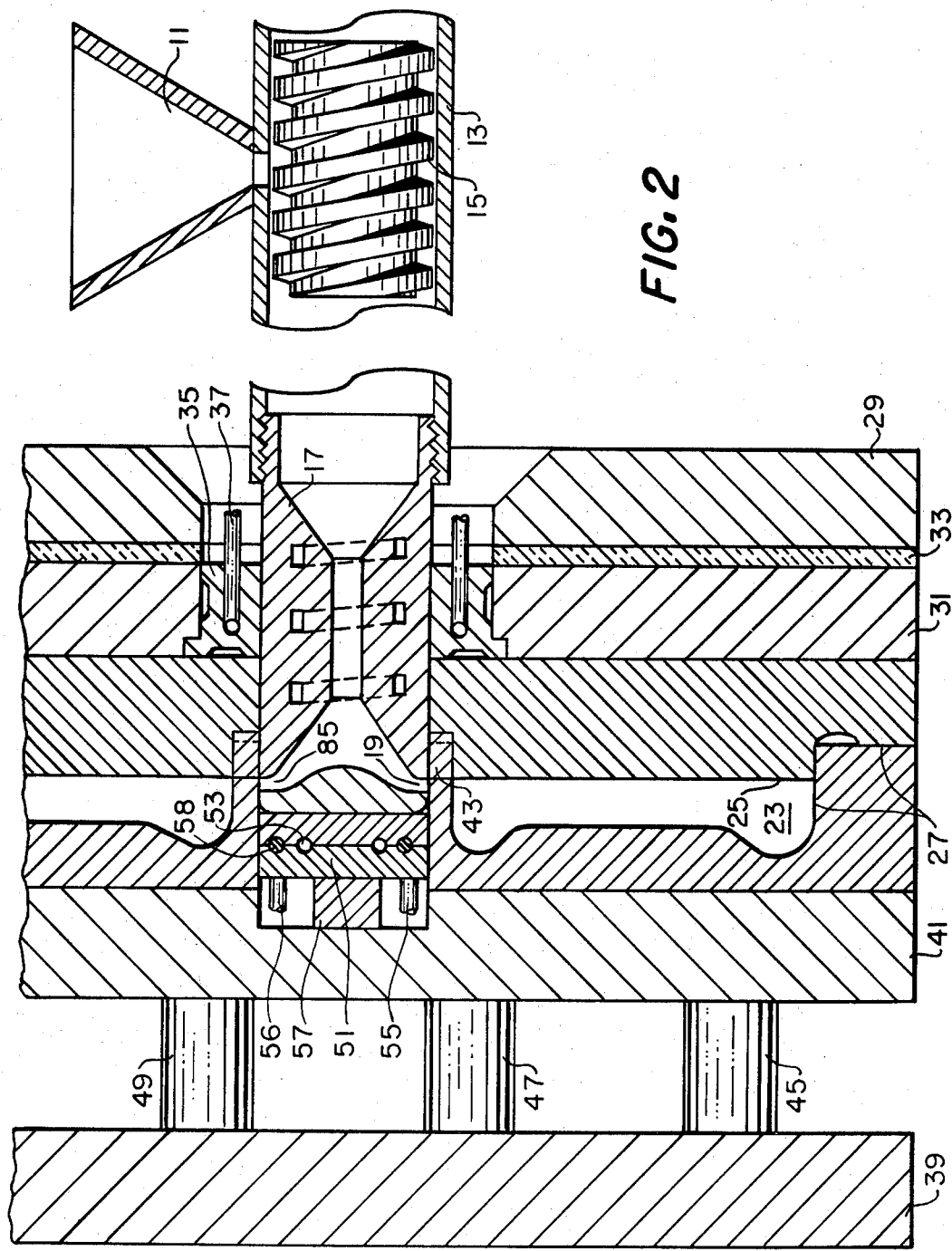

FIG. 2 shows the apparatus of FIG. 1 in the compression stage. In this stage the molds are completely closed. The thermosetting material within the confines of the closed mold during this stage is pressed and heated to cure the enclosed material to the shape of the mold cavity.

Figure 3:
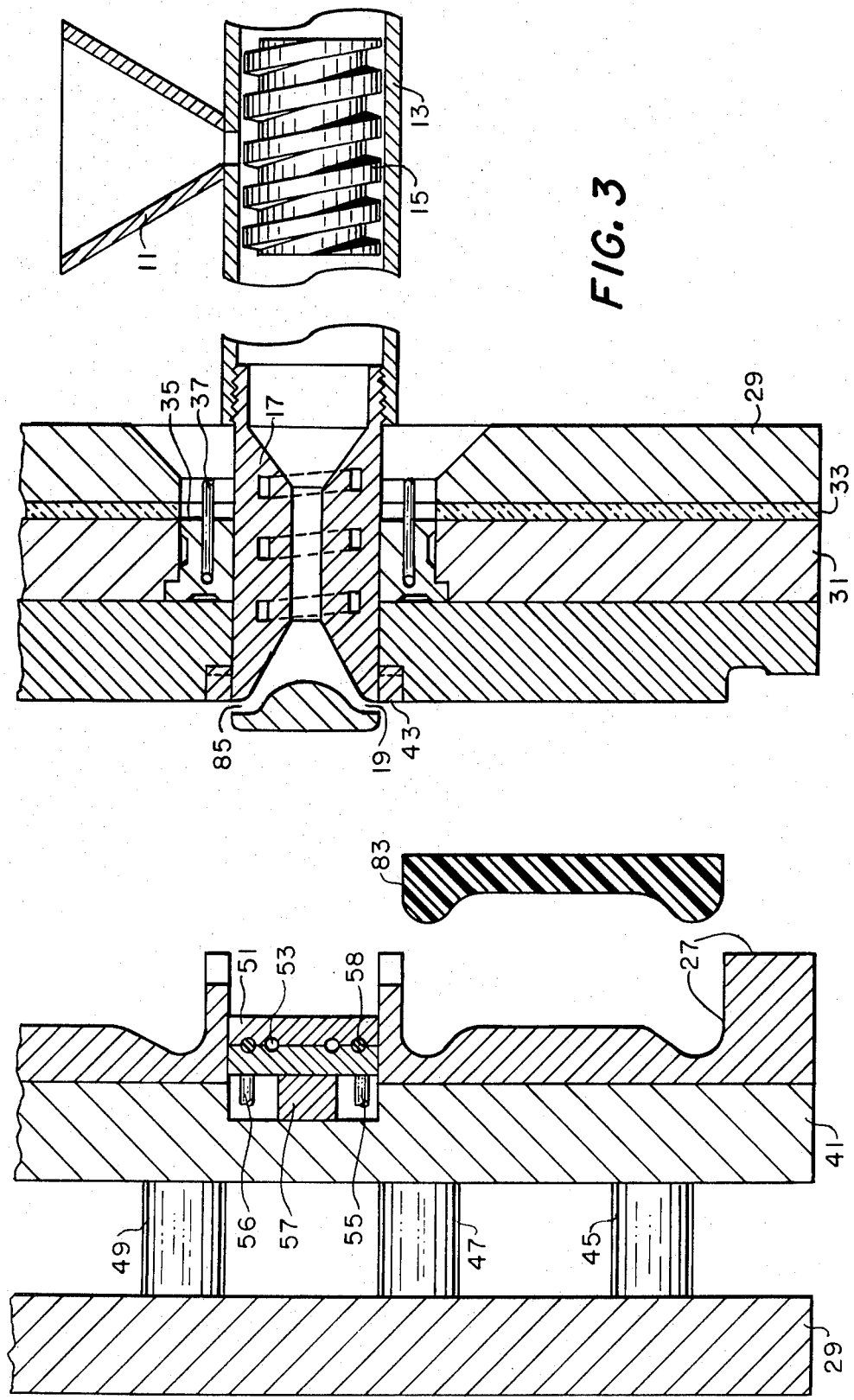

FIG. 3 shows the apparatus of FIG. 1 in an open position. In this position the moveable platen assembly has been actuated to move in a direction away from the stationary platen assembly, allowing the removal of the molded articles from the open mold faces and facilitating the cleaning of the mold faces and surrounding area in preparation for repositioning the components in the feed stage as shown in FIG. 1.

Figure 4:
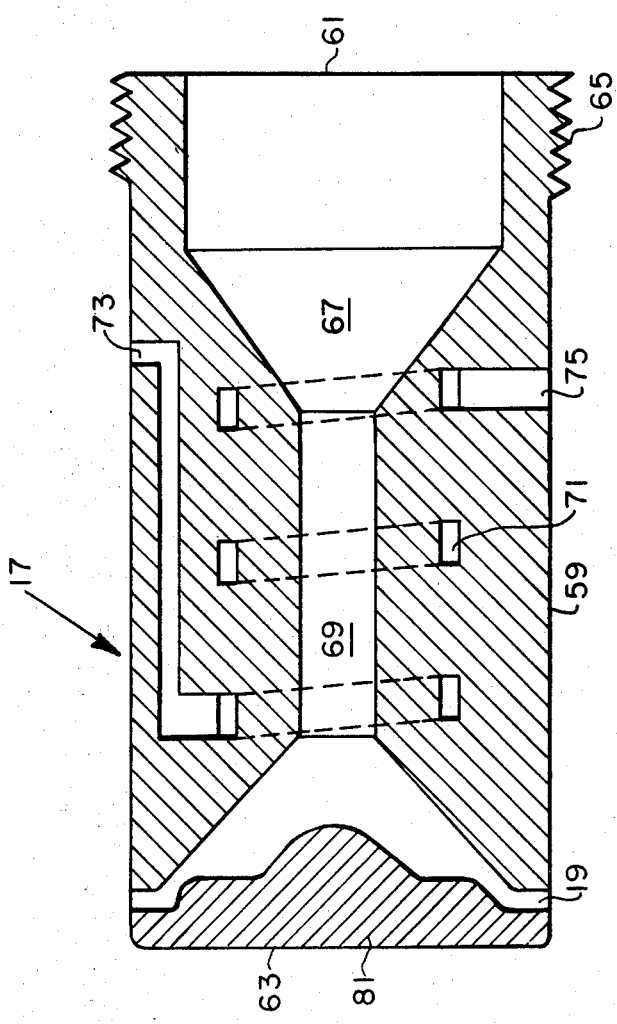

FIG. 4 is an axial cross-sectional view showing the feed nozzle assembly of FIGS. 1, 2 and 3 in detail.

Looking now at FIG. 1, thermosetting molding material is fed into feed hopper 11 and then into a plasticizing zone formed by heated barrel 13 and by the mechanical working of screw 15. A predetermined amount of plasticized molding material is subsequently injected by screw 15, acting as a ram, through nozzle member 17, through feed outlets, such as 19, runner channels, such as 21, into mold cavities, such as 23, formed by partially open mold faces, such as 25 and 27.

The stationary assembly is comprised of stationary platen or support plate 29 which has stationary heat plate 31 mounted thereon. Suitably, heat plate 31 is separated from platen 29 by a layer of insulation 33, e.g., insulating board. Heat plate 31 has a plurality of mold faces, such as 25, mounted thereon. Heat plate 31 may suitably be heated by the circulation of steam or hot oil therethrough, but more preferably, electrically. Heat plate 31 supplies heat to mold faces, such as 25. The temperature maintained on the mold faces is sufficiently high that, when combined with the pressure generated when the mold is completely closed, will cure or set the thermosetting material within the mold cavity. Temperatures in a range of between about 135° and about 216° C. (275° to 425° F.) are generally useful, and, within that range, temperatures between about 149° and about 199° C. (300° to 390° F.) are particularly useful for a wide variety of thermosetting mold materials.

In a preferred embodiment, stationary heat plate 31 is provided with a temperature-controlled insert, or sleeve member 35. Sleeve member 35 is positioned to insulate nozzle member 17 from heat plate 31. The temperature in sleeve member 35 is controlled by the circulation of a fluid, such as water, at the desired temperature through channels, such as 37. The temperature in sleeve member 35 is maintained below the temperature at which any substantial curing of the thermosetting molding material will occur and sufficiently high to maintain the thermosetting material in a plasticized condition. Temperatures below which any substantial curing takes place are temperatures which are sufficiently low that the fluidity of the plasticized thermosetting feed material is not permanently affected. Generally, temperatures in the range of between about 77° and about 121° C. (170° to 250° F.) are useful, and, temperatures from about 90° to about 116° C. (210° to 240° F.) are preferably maintained.

The moveable assembly consists of moveable platen, or support plate 39 which has heat plate 41 mounted thereon and moveable therewith. Heat plate 41 has a plurality of mold faces, such as 27, mounted thereon, positioned to align in register with corresponding mold faces, such as 25, of the stationary platen assembly.

Support blocks, such as 45, 47 and 49, are suitably utilized between platen 39 and heat plate 41 to support platen 39. The space between platen 39 and plate 41 provides space to operate a knock out assembly (not shown) which facilitates removal of mold parts from the mold. The moveable assembly is adapted to be moved reciprically, as a unit, by means not shown, but suitably hydraulically, in and out of aligned contact with the stationary platen assembly.

Moveable heat plate 41 is suitably heated by the circulation of steam or heated oil therethrough, but, more practically, electrically, to maintain a temperature on the mold faces, such as 27, comparable to that maintained on the corresponding mold faces, such as 25, that is, a temperature sufficiently high to cure the thermosetting material upon complete closure of the mold faces.

Mold faces, such as 27, are provided with runner channels, such as 21, connecting the mold cavities with feed outlets, such as 19, of nozzle member 17 when the apparatus components are positioned in the injection stage of the molding cycle as shown in FIG. 1.

In a preferred embodiment, moveable heat plate 41 is provided with a temperature-controlled area therein. The temperature-controlled area is positioned to be aligned with, and contiguous to the closed end of nozzle member 17 when the mold faces are in a fully closed position. The temperature-controlled area is provided by a temperature-controlled plate 51. Plate 51 has an internal reservoir, suitably comprised of internal connected channels 53, having an inlet 55 and an outlet 56 to receive and circulate a supply of liquid, e.g., water, at the desired temperature. Plate 51 is preferably separated from direct contact with heat plate 41 along adjacent face thereof by spacers, such as 57, and is provided with rubber sealing gasket 58. Temperature-controlled plate 51 is maintained at a temperature lower than that at which any substantial curing of the thermosetting molding material will occur, but sufficiently high that the thermosetting molding material will remain in a plasticized state. Generally, temperatures between about 77° and about 121° C. (170° to 250° F.) are utilized, and, within that range, temperatures between about 99° and about 116° C. (210° to 240° F.) are aptly suited.

The plasticized molding material partially fills the mold cavity formed by partially open mold faces 25 and 27. The distance the mold faces move from a partially open position to a fully closed position generally ranges between about 0.06 and about 0.50 inches and, more preferably, between about 0.10 and about 0.2 inches. This distance is also the clearance through the runner channels, such as 19, through which the thermosetting molding material passes from nozzle 17 to the mold cavities. Openings less than about 0.06 inches usually do not allow an easy flow of the molding material through the runner channels, and openings greater than about 0.50 inches can produce uneven density of material in the molded part. The moveable assembly, containing the mold face 27, is provided with runner channels 21. Mold face 25 in the stationary assembly is provided with a runner cut-off member 43 which is positioned to closely fit into runner channel 21 to seal off escape of material from the mold cavity during the compression cycle.

FIG. 2 shows the apparatus of FIG. 1 in a close or compression stage of the molding cycle. Moveable platen assembly has moved toward the stationary platen assembly to close aligned mold faces, such as 25 and 27, and runner cut-offs, such as 43, has entered into mold face 27 to seal off runner channels, such as 21. Thermosetting molding material previously fed into the space between the partially open mold faces is pressed and heated to cure the enclosed material to the internal shape of the mold.

One of the advantages of the apparatus of the invention is that low injection pressures can be employed to inject the molding material into the mold cavities, since in the injection compression process the injection cycle is not used to completely fill out the cavities. Complete fill out occurs in the compression cycle of the process.

FIG. 3 shows the apparatus of FIG. 1 in an open position. In this position, the moveable platen assembly has been retracted moved away from the stationary assembly. The molded articles, for example, 83, are removed from the molds, suitably by the aid of knock-out pins, not shown, usually positioned in the moveable mold faces. In this position, any flash is removed, the channel and mold face areas are cleaned if necessary, and the components readies for repositioning as shown in FIG. 1. At the point shown in FIG. 3, the thermosetting molding material in the nozzle and barrel is stored in a plasticized, substantially uncured state in preparation for the next shot or injection of thermosetting material into the mold cavities.

FIG. 4 shows the feed nozzle assembly of the present invention in detail. Nozzle member 17 consists of housing 59, preferably cylindrical in shape, having open end 61 and closed end 63. The open end is adapted to be connected to the feed barrel of a conventional screw-type molding machine, suitably by thread means 65. Nozzle member 17 has an internal chamber 67, formed by closed end 63 and the interior face of housing 59. Internal chamber 67 has a constricted chamber portion, or zone, 69, formed by a narrowing of a portion of the internal wall of housing 59 intermediate the open end 61 and closed end 63. Nozzle 17 is equipped with a temperature-controlled means comprised of a reservoir, comprised of channel or channels 71, in the thickened wall portion of housing 59, and preferably encircling constricted zone 69. Suitably, reservoir 71 has an inlet 73 and an outlet 75 for circulating a liquid, e.g., water of the desired temperature, through reservoir 71. The temperature of the circulating fluid is adjusted to maintain a temperature in the nozzle member sufficiently high to keep thermosetting molding material within the nozzle in a plasticized state and sufficiently low that no substantial curing or setting up of the material occurs. Usually, temperatures between about 77° and about 121° C. (170° to 250° F.) and, within that range, temperatures between about 99° and about 116° C. (210° to 240° F.) are useful for a wide variety of thermosetting materials.

Nozzle 17 has a plurality of feed outlets, or orifices, such as 19, connected to internal chamber 67 and positioned around the periphery thereof contiguous to closed end 63. Each feed outlet is adapted to be aligned with a runner channel to feed thermosetting molding material from nozzle member 17 into a mold cavity. Nozzle member 17 preferably has a material distribution means comprised of flattened conical member 81 suitably affixed such as by screws to the internal face of closed end 63 of housing 59. Thermosetting molding material passes over conical member 81 and is directed axially outward in an even flow through feed outlets, such as 19, which are preferably positioned around the periphery of flattened conical member 81.

The apparatus components are preferably fabricated of mold steels selected to withstand the conditions of use.

It will be understood that the present invention provides for the employment of a plurality of mold cavities fed by a single nozzle member. The drawings contemplate, but do not show, additional mold capacity fed by feed orifices, such as 85, through additional runner channels, such as 87. Preferably, the molds positioned around the periphery of the feed nozzle are balanced, that is, each of the molds requires equal amounts of plasticized material for filling.

For purposes of simplicity, the present invention has been described in terms of a horizontal clamping arrangement; however, it will be appreciated and understood that the invention is equally adapted to, and useful in, vertical clamping arrangements.

The foregoing description and embodiments are intended to illustrate the invention without limiting it thereby. It will be appreciated that various modifications can be made in the invention without departing from the spirit or scope thereof.

In the above-described drawings the visible edges and exposed surface behind the cutting plane have been omitted in the vicinity of the mold cavities to simplify the drawings and facilitate the understanding of the apparatus of the invention.

What is claimed is:

1. An improved injection-compression molding apparatus comprising:
    a stationary assembly comprised of:
        a stationary platen member,
        a heat plate mounted thereon, means to heat said plate, and
        a plurality of mold faces with runner channels mounted on said heat plate;
    a moveable assembly comprised of:
        a moveable platen member,
        a heat plate mounted thereon, means for heating said plate, and
        a plurality of mold faces mounted on said heat plate corresponding to and positioned to be aligned with the mold faces on said stationary assembly to form a plurality of mold cavities;
    a feed nozzle assembly comprised of:
        a housing having a closed end and an open end,
        said open end adapted to be attached to the injection barrel of an injection molding machine,
        said closed end and interior of said housing forming an internal chamber,
        said internal chamber narrowing along a portion thereof to form a constricted zone,
        the portion of said housing adjacent said constricted zone containing a means for controlling the temperature within said constricted zone,
        said housing having a plurality of feed outlets positioned along the outside periphery thereof contiguous to said closed end, and
        said feed outlets connecting with said internal chamber;
    wherein said moveable assembly has a temperature-controlled area comprised of a temperature-controlled plate member that is in contact with and assists in cooling the closed end of said nozzle assembly when the moveable assembly is in contact with the stationary assembly;
    means to move said moveable assembly to bring said moveable mold faces into close proximity and aligned with corresponding faces in said stationary assembly to form partially open mold cavities and runner channels connected to the exterior of the mold cavities,
    means for feeding a supply of plasticized thermosetting molding material into the open end of said nozzle member, through said feed outlets, through said runner channels and into said partially open mold cavities,
    means to seal off said runner channels to retain molding material in the mold cavities during the curing cycle,
    means for closing said partially open mold cavities to compress and cure the thermosetting material enclosed within the mold cavities by pressure and heat, and
    means for retracting said moveable assembly to separate said mold faces and remove a molded article.

2. An improved injection-compression molding apparatus comprising:
    a stationary assembly comprised of:
        a stationary platen member,
        a heat plate mounted thereon, means to heat said plate, and
        a plurality of mold faces with runner channels mounted on said heat plate;
    a moveable assembly comprised of:
        a moveable platen member,
        a heat plate mounted thereon, means for heating said plate, and
        a plurality of mold faces mounted on said heat plate corresponding to and positioned to be aligned with the mold faces on said stationary assembly to form a plurality of mold cavities; p1 a feed nozzle assembly comprised of:
        a housing having a closed end and an open end,
        said open end adapted to be attached to the injection barrel of an injection molding machine,
        said closed end and interior of said housing forming an internal chamber,
        said internal chamber narrowing along a portion thereof to form a constricted zone,
        the portion of said housing adjacent said constricted zone containing a means for controlling the temperature within said constricted zone,
        said housing having a plurality of feed outlets positioned along the outside periphery thereof contiguous to said closed end, and
        said feed outlets connecting with said internal chamber;
    wherein said moveable heat plate has a temperature-controlled area comprised of a temperature-controlled plate member aligned with the closed end of said nozzle member, said plate having operably connected means for maintaining its temperature lower than that at which any substantial curing of the thermosetting molding material will occur but sufficiently high to maintan the molding material in a plasticized condition;
    means to move said moveable assembly to bring said moveable mold faces into close proximity and aligned with corresponding faces in said stationary assembly to form partially open mold cavities and runner channels connected to the exterior of the mold cavities,
    means for feeding a supply of plasticized thermosetting molding material into the open end of said nozzle member, through said feed outlets, through said runner channels and into said partially open mold cavities, means to seal off said runner channels to retain molding material in the mold cavities during the curing cycle, means for closing said partially open mold cavities to compress and cure the thermosetting material enclosed within the mold cavities by pressure and heat, and means for retracting said movable to separate said mold faces and remove a molded article.

3. The apparatus of claim 2 wherein said temperature controlled plate member has operably connected means to maintain its temperature at about 77° to about 121° C.

4. An improved injection-compression molding apparatus comprising:
 a stationary assembly comprised of:
  a stationary platen member,
  a heat plate mounted thereon, means to heat said plate, and
  a plurality of mold faces with runner channels mounted on said heat plate;
 a moveable assembly comprised of:
  a moveable platen member,
  a heat plate mounted thereon, means for heating said plate, and
  a plurality of mold faces mounted on said heat plate corresponding to and positioned to be aligned with the mold faces on said stationary assembly to form a plurality of mold cavities;
 a feed nozzle assembly comprised of:
  a housing having a closed end and an open end,
  said open end adapted to be attached to the injection barrel of an injection molding machine,
  said closed end and interior of said housing forming an internal chamber,
  said internal chamber narrowing along a portion thereof to form a constricted zone,
  the portion of said housing adjacent said constricted zone containing a means for controlling the temperature within said constricted zone,
  said housing having a plurality of feed outlets positioned along the outside periphery thereof contiguous to said closed end, and
  said feed outlets connecting with said internal chamber;
 wherein the stationary heat plate has a temperature-controlled sleeve member therein, positioned to surround the housing member of said nozzle assembly and separate said heat plate from said housing;
 means to move said moveable assembly to bring said moveable mold faces into close proximity and aligned with corresponding faces in said stationary assembly to form partially open mold cavities and runner channels connected to the exterior of the mold cavities,
 means for feeding a supply of plasticized thermosetting molding material into the open end of said nozzle member, through said feed outlets, through said runner channels and into said partially open mold cavities,
 means to seal off said runner channels to retain molding material in the mold cavities during the curing cycle,
 means for closing said partially open mold cavities to compress and cure the thermosetting material enclosed within the mold cavities by pressure and heat, and
 means for retracting said moveable assembly to separate said mold faces and remove a molded article.

5. The apparatus of claim 4 wherein said sleeve member has operably connected means for maintaining its temperature below the temperature at which any substantial curing of the molding material will occur and sufficiently high to maintain the molding material in a plasticized condition.

6. The apparatus of claim 4 wherein said sleeve member has operably connected means for maintaining its temperature with the range of about 77° to about 121° C.

7. An improved injection-compression molding apparatus comprising:
 a stationary assembly comprised of:
  a stationary platen member,
  a heat plate mounted thereon, means to heat said plate, and
  a plurality of mold faces with runner channels mounted on said heat plate;
 a moveable assembly comprised of:
  a moveable platen member,
  a heat plate mounted thereon, means for heating said plate, and
  a plurality of mold faces mounted on said heat plate corresponding to and positioned to be aligned with the mold faces on said stationary assembly to form a plurality of mold cavities;
 a feed nozzle assembly comprised of:
  a housing having a closed end and an open end,
  said open end adapted to be attached to the injection barrel of an injection molding machine,
  said closed end and interior of said housing forming an internal chamber,
  said internal chamber narrowing along a portion thereof to form a constricted zone,
  the portion of said housing adjacent said constricted zone containing a means for controlling the temperature within said constricted zone,
  said housing having a plurality of feed outlets positioned along the outside periphery thereof contiguous to said closed end,
  said feed outlets connecting with said internal chamber; and
  said feed nozzle assembly positioned such that feed outlets project beyond said stationary assembly;
 means to move said moveable assembly to bring said moveable mold faces into close proximity and aligned with corresponding faces in said stationary assembly to form partially open mold cavities and runner channels connected to the exterior of the mold cavities, whereby said feed nozzle assembly is fixedly positioned with respect to said stationary assembly,
 means for feeding a supply of plasticized thermosetting molding material into the open end of said nozzle member, through said feed outlets, through said runner channels and into said partially open mold cavities,
 means to seal off said runner channels by movement of said moveable assembly with respect to said fixed nozzle assembly and said stationary assembly to retain molding material in the mold cavities during the curing cycle,
 means for closing said partially open mold cavities to compress and cure the thermosetting material enclosed within the mold cavities by pressure and heat, and means for retracting said moveable assembly to separate said mold faces and remove a molded article.

8. The apparatus of claim 7 having operably connected means for maintaining the mold face at a temperature from about 135° to about 215° C.

9. The apparatus of claim 7 wherein the means for controlling the temperature within said feed nozzle assembly comprises an internal reservoir within said constricted zone of said housing adapted to receive a circulating liquid of the desired temperature.

10. The apparatus of claim 9 wherein the feed nozzle assembly has operably connected means for maintaining its temperature sufficiently low that no substantial curing of the thermosetting molding material may occur and sufficiently high to maintain the molding material in a plasticized condition.

11. The apparatus of claim 10 wherein the feed nozzle assembly has operably connected means for maintaining its temperature within the range of about 77° to about 121° C.

* * * * *

UNITED STATES PATENT OFFICE
CERTIFICATE OF CORRECTION

Patent No. 4,290,744            Dated September 22, 1981

Inventor(s) W. Andrew Dannels et al.

It is certified that error appears in the above-identified patent and that said Letters Patent are hereby corrected as shown below:

At Claim 2, column 9, line 10 for "said moveable to separate" read "said moveable assembly to separate".

Signed and Sealed this

Twentieth Day of April 1982

[SEAL]

Attest:

GERALD J. MOSSINGHOFF

Attesting Officer     Commissioner of Patents and Trademarks